(12) United States Patent
Sugimoto et al.

(10) Patent No.: US 6,616,302 B2
(45) Date of Patent: Sep. 9, 2003

(54) VEHICLE LAMP

(75) Inventors: Atsushi Sugimoto, Shizuoka (JP); Keiichi Tajima, Shizuoka (JP); Kazuma Mochizuki, Shizuoka (JP); Masanori Nishigaya, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/989,999

(22) Filed: Nov. 21, 2001

(65) Prior Publication Data

US 2002/0064045 A1 May 30, 2002

(30) Foreign Application Priority Data

Nov. 24, 2000 (JP) ........................................ 2000-358006

(51) Int. Cl.[7] .............................. F21V 14/00; B60Q 1/00
(52) U.S. Cl. ...................... 362/272; 362/286; 362/526
(58) Field of Search ................................. 362/271, 272, 362/274, 286, 287, 288, 386, 427, 428, 524, 526, 546

(56) References Cited

U.S. PATENT DOCUMENTS

| 4,276,581 | A | * | 6/1981 | Orii et al. ..................... 362/66 |
| 4,663,696 | A | | 5/1987 | Miyazawa et al. |
| 4,827,388 | A | | 5/1989 | Miyazawa |
| 4,831,506 | A | | 5/1989 | Miyazawa |
| 4,916,587 | A | * | 4/1990 | Hirose et al. ................ 362/273 |
| 5,041,947 | A | * | 8/1991 | Yuen et al. .................. 362/286 |
| 5,412,543 | A | | 5/1995 | Kobayashi et al. |

* cited by examiner

*Primary Examiner*—Y. My Quach-Lee
(74) *Attorney, Agent, or Firm*—Fish & Richardson P.C.

(57) ABSTRACT

A vehicle lamp includes a drive portion having a drive source, and a lamp body that has a light source and that is supported by a rotary shaft operable to be rotated by the drive portion. A rotary contact is provided around the rotary shaft and rotates together with the lamp body. A fixed contact is provided for the drive portion. The rotary contact and the light source are electrically connected through a power supply cord and electric power is supplied to the fixed contact.

12 Claims, 7 Drawing Sheets

VEHICLE LAMP

BACKGROUND OF THE INVENTION

The present invention relates to a vehicle lamp. Specifically, a vehicle lamp that rotates is disclosed that reduces a load applied onto a power supply cord with rotation.

DESCRIPTION OF THE RELATED ART

Conventionally, there is a vehicle lamp provided rotatably in relation to a car body.

In the rotatable vehicle lamp, in case that a power supply cord is extended from a position distant from a rotary shaft to a light source, stress applied onto the power supply cord with the rotation, and particularly stress due to a twist are reduced. However, a range where the power supply cord moves with the rotation becomes wide, and a wide space for making the movement of the power supply cord possible must be secured. In an automobile field where the mounted devices increase with a progress of technology, but a compact size is required, it is difficult to secure a wide space for only the purpose of securing the movement of the power supply cord.

In order to make small the moving range of the power supply cord with the rotation, it is good to pull out the power supply cord from a position near the rotary shaft. However, the twist amount of the power supply cord with the rotation becomes large, so that there is a problem that the stress applied onto the power supply cord becomes large.

SUMMARY OF THE INVENTION

Therefore, the present invention reduces the moving range of the power supply cord with the rotation and reduces the load applied onto the power supply cord.

DETAILED DESCRIPTION

An embodiment of a vehicle lamp according to the invention will be described below with reference to attached drawings.

Figure 1:
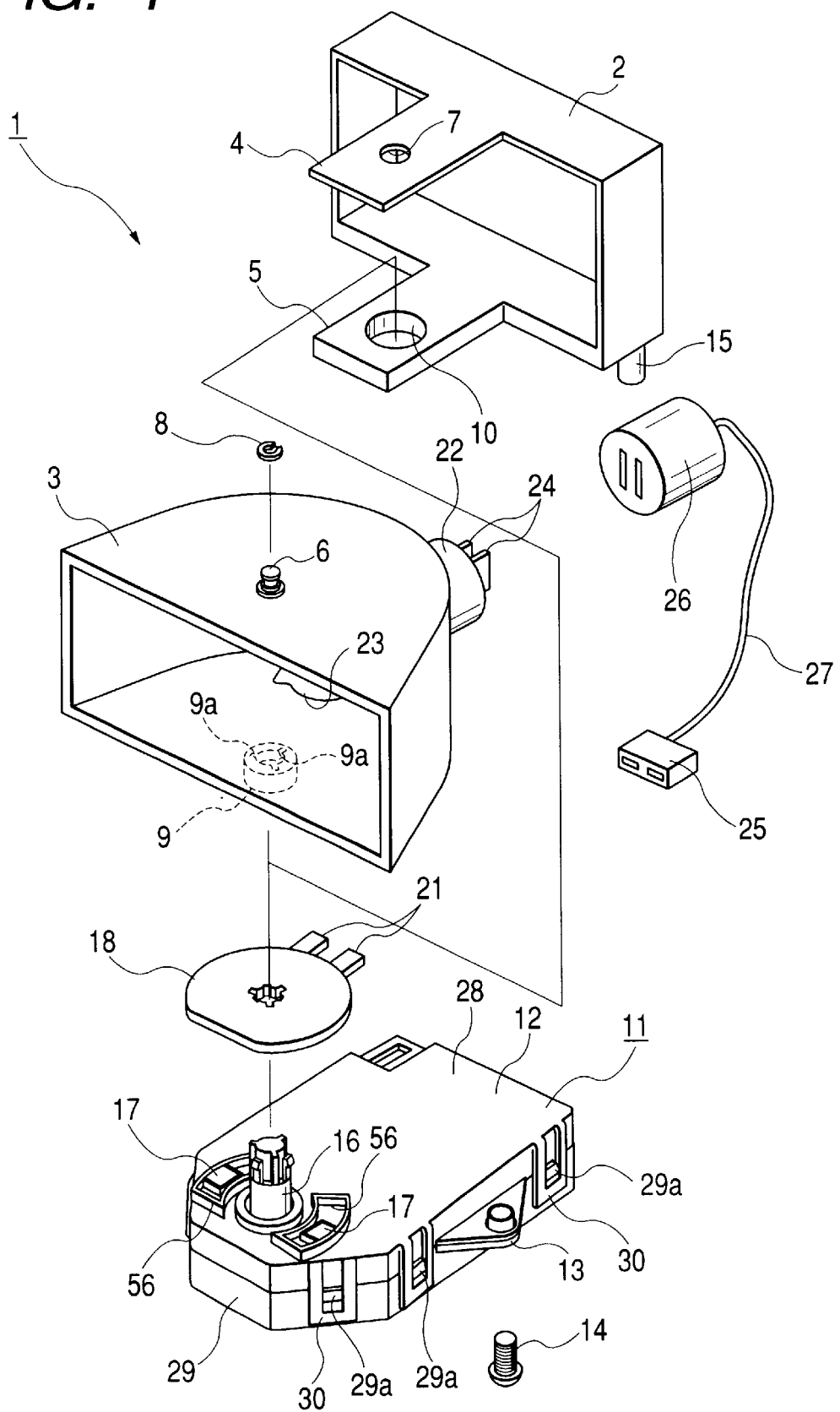
FIG. 1 is an exploded perspective view showing an entire embodiment of a vehicle lamp according to the invention.

FIG. 1 depicts a vehicle lamp 1 having a lamp body 3 rotatably supported by a bracket 2 fixed to a car body. The bracket 2 has two support arms 4, 5 opposed to each other in a state where they are vertically separate from each other, and the lamp body 3 is supported rotatably by leading end portions of the support arms. Specifically, a shaft 6 protrudes from the upper surface of the lamp body 3, the shaft 6 is inserted into an insertion hole 7 formed at the leading end of the upper support arm 4, and a retaining washer 8 for preventing slip-out is fitted to the portion of the shaft 6 that protrudes from the insertion hole 7. The upper portion of the lamp body 3 is rotatably supported by the support arm 4. Further, in the lower portion of the lamp body 3, a coupling hole 9 opened on a bottom surface is formed. The coupling hole 9 contains axially extending grooves 9a, 9a, 9a for positioning in the rotational direction. The coupling hole 9 faces downward and is accessible through an insertion hole 10 formed in the leading end of the lower support arm 5.

Underneath the lower support arm 5 of the bracket 2, is a drive portion 11. The drive portion 11 includes necessary members and parts within a case body 12 or supported by the case body 12. From the side surfaces of the case body 12, fixed pieces 13, 13 protrude, and fixed screws 14, 14 are inserted into the fixed pieces 13, 13 from underneath and are fitted in fixed bosses 15, 15 that protrude from the lower surface of the above bracket 2. The drive portion 11 is thereby fixed to the lower support arm 5 of the bracket 2 (refer to FIG. 1).

A rotary shaft 16 protrudes from the upper surface of the case body 12 of the drive portion 11. Fixed contacts 17, 17 are provided in positions near the rotary shaft 16 and protrude from the upper surface of the case body 12 (refer to FIG. 1). These contacts 17, 17 are connected to a power source. Namely, one fixed contact 17 is connected through a lighting switch (not shown) to a battery by wires 60 and conductive plates, another fixed contact 17 and the other end portion is grounded.

The rotary shaft 16 is inserted into the insertion hole 10 formed in the lower support arm 5 of the bracket 2 and coupled to the coupling hole 9 of the lower surface of the lamp body 3. A contact plate 18 is also attached to a portion of the rotary shaft 16; the contact plate 18 is located beneath the support arm 5. Arc shaped rotary contacts 20, 20 are formed on a lower surface 19 of the contact plate 18, in positions on opposite sides of a center area (refer to FIG. 4). When the contact plate 18 is attached to the rotary shaft 16, the rotary contacts 20, 20 individually come into contact with the fixed contacts 17, 17 of the drive portion. Connector pins 21, 21, which are connected individually to the above rotary contacts 20, 20, protrude from a rear end of the contact plate 18 (refer to FIG. 1).

At the rear portion of the lamp body 3, a light source bulb 23 is attached through a bulb socket 22 detachably attached to the lamp body 3. Connector pins 24, 24 protruding from the rear end of the bulb socket 22 and the connector pins 21, 21 protruding from the contact plate 18 are electrically connected by a power supply cord 27 having connectors 25, 26 at its ends (refer to FIG. 1). Accordingly, the light source bulb 23 is connected to the power supply through the fixed contacts 17, 17, the rotary contacts 20, 20 of the connector plate 18 and the power supply cord 27. Further, since the rotary contacts 20, 20 come into slide contact with the fixed contacts 17, 17, even if the lamp body 3 rotates, the electrical connection between the power supply and the light source bulb 23 is not severed.

In the above vehicle lamp 1, when the drive portion 11 is driven and the rotary shaft 16 rotates, the lamp body 3 attached to the drive shaft 16 rotates, so that the direction of light irradiation changes in a horizontal direction. When the lamp body 3 thus rotates, since the entire power supply cord 27 rotates together with the lamp body 3, the power supply cord 27 does not become twisted, so that stress is not produced in the power supply cord 27 with the rotation of the lamp body 3.

The above vehicle lamp 1 can be used in various applications. For example, this lamp 1 may be used as a single lamp in which a transparent cover or a lens is attached to a front opening portion of the lamp body 3, or the lamp 1 may be used in combination with another lamp and arranged in a large lamp housing.

The drive portion 11 is described below in detail with reference to FIG. 2.

Regarding the drive portion 11, its necessary members and parts are arranged in the case body 12 or supported by the case body 12. In the illustrated implementation, the case body 12 is formed by coupling an upper half 28 and a lower half 29. From a fringe of the upper half 28, coupling pieces 30, 30 are protrude downward, and fitting holes 30a, 30a, are formed in the coupling pieces 30, 30. On side surfaces of the lower half 29, fitting projections 29a, 29a, are formed, and the fitting projections 29a, 29a, of the lower half 29 are fitted in the fitting holes 30a, 30a, of the coupling pieces 30, 30. As shown, the upper half 28 and the lower half 29 face each other at their sidewalls, whereby the upper and lower halves 28, 29 are coupled and the case body 12 is formed (refer to FIG. 2).

Figure 2:
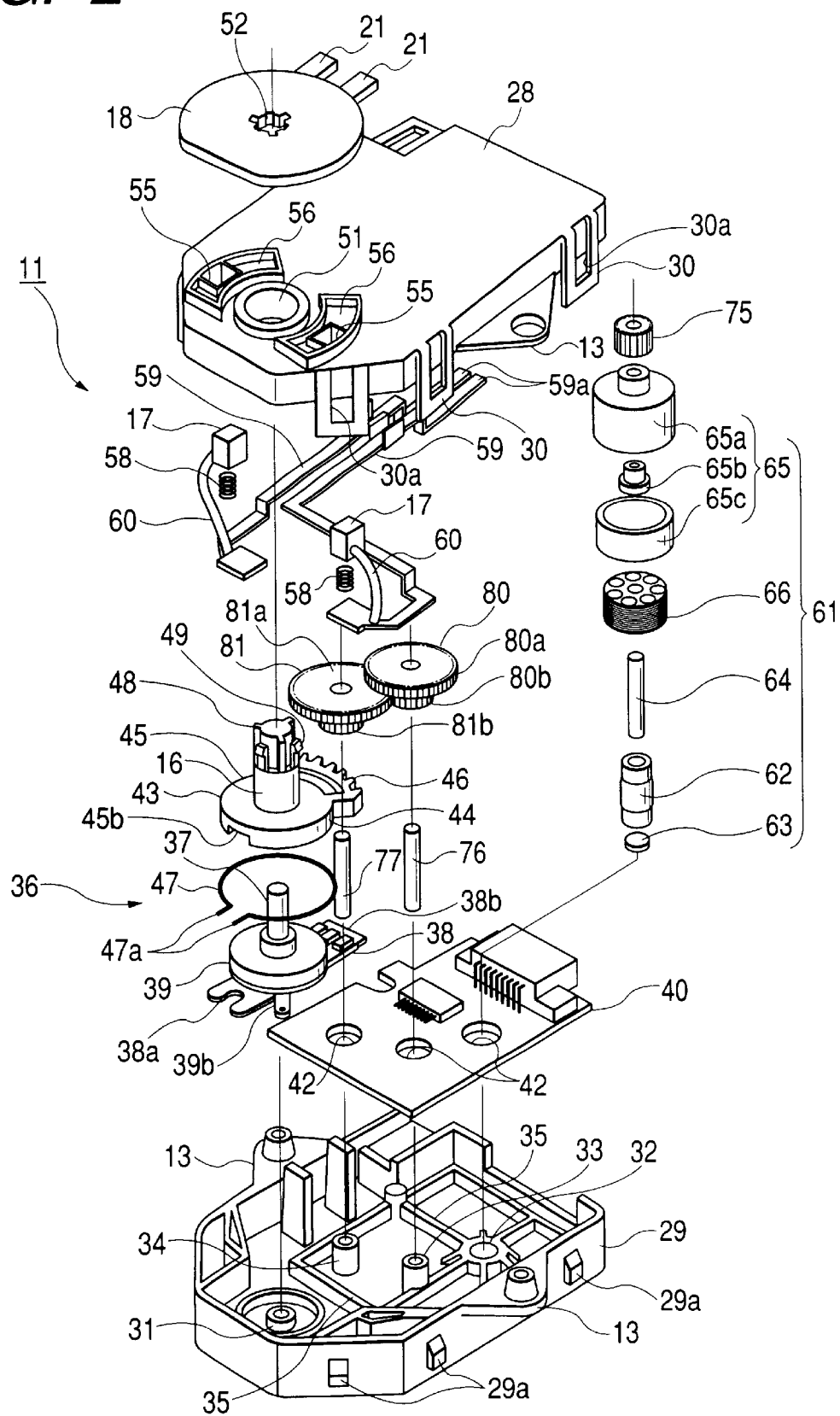
FIG. 2 is an exploded perspective view of a drive portion according to the invention.

On a bottom surface of the lower half 29, projecting shaft standing bosses 31, 32, 33, 34 and a plate mounting rib 35 are provided (refer to FIG. 2).

A fixed shaft 37 of a potentiometer 36 projects from the shaft standing boss 31. The potentiometer 36 comprises a base plate 38, a rotary disc 39, and the fixed shaft 37; the fixed shaft 37 is fixed onto the base plate 38; the rotary disc 39 is rotatably supported by the fixed shaft 37 when it comes into contact with the top of the base plate 38 (refer to FIG. 3); and a resistance conductor (not shown) formed on the base plate 38 and a bridged contact (not shown) formed on the rotary disc 39 constitute a rheostat. A resistance value is output from the rheostat that corresponds to a rotational angle of the rotary disc 39 in relation to the base plate 38.

At one end of the base plate 38, a fitting notch 38a is formed. At the other end of the base plate 38, a connecting terminal 38b is formed (refer to FIGS. 2 and 3).

On an outer surface of the rotary disc 39, a groove 39a is formed. From a side surface of the rotary disc 39 protrudes an adjustment projection 39b having a hole (refer to FIGS. 2 and 3).

A portion near the lower end of the fixed shaft 37 of the potentiometer 36 is caulked and fixed on the base plate 38. A portion of the fixed shaft 37 protruding downward from the base plate 38 is forced into the shaft standing boss 31 formed in the lower half 29 (refer to FIG. 3). In addition, the connecting terminal 38b is connected to a predetermined conductor on a print substrate 40 (printed circuit board), and the fitting notch 38a is fitted to a positioning projection 41 formed in the lower half 29, whereby facing of the base plate 38 to the lower half 29 is defined (refer to FIGS. 2 and 3).

The print substrate 40 is mounted on a plate mounting rib 35. Further, insertion holes 42, 42, 42 are formed in the print substrate 40 in positions corresponding to the shaft standing bosses 32, 33, 34 (refer to FIGS. 2 and 3).

The fixed shaft 37 of the potentiometer 36 rotatably supports an output rotation member 43. The rotary shaft 16 protrudes from a center of an internal output gear 44 of the output rotation member 43. The output gear 44 is formed by integrally forming a disc 45 and a sector gear 46 protruding from a side surface of the disc 45 (refer to FIG. 2).

Formed on a lower surface of the disc 45 of the output gear 44 is a circular recess 45a, and the rotary disc 39 of the potentiometer 36 is located in the recess 45a. At a fringe of the lower surface of the disc 45, a fitting notch 45b is formed that communicates with the recess 45a. Further, a support hole 16a opened in the recess 45a is formed in the rotary shaft 16, and the fixed shaft 37 of the potentiometer 36 is rotatably inserted into the support hole 16a, whereby the output rotation member 43 is rotatably supported by the fixed shaft 37 of the potentiometer 36 (refer to FIG. 3).

Between the rotary disc 39 of the potentiometer 36 and the disc 45 of the output gear 44, a coupling spring 47 is interposed as a clutch means. The coupling spring 47 is formed by curving a wire spring material annularly and bending both end portions 47a, 47a outward so that they become parallel to each other (refer to FIG. 2).

The diameter of the coupling spring 47 before incorporation is smaller than the diameter of the groove 39a of the rotary disc 39 of the potentiometer 36. Accordingly, when the spring 47 is fitted to the groove 39a, the groove 39a is constricted by elastic force, while both end portions 47a, 47a are fitted to the fitting notch 45b of the disc 45 of the output gear 44 (refer to FIG. 3). Hereby, the rotation of the output gear 44 is transmitted to the coupling spring 47, and the rotation of the coupling spring 47 is transmitted to the rotary disc 39 by friction between the coupling spring 47 and the rotary disc 39. Accordingly, when the rotation of one of the output gear 44 and the rotary disc 39 is controlled and the other is rotated, a slip is produced between the coupling spring 47 and the rotary disc 39.

Projecting members 48, 48, 48 are integrally formed with the output gear 44 at the upper half portion of the rotary shaft 16 and are spaced in surrounding positions at nearly equal intervals and extend axially. Fitting arm pieces 49, 49, 49 are formed among these projecting members 48, 48, 48 (refer to FIG. 2). The fitting arm piece 49 extends axially in a state where it is distant from the outer surface of the rotary shaft 16, and its lower end portion is coupled to the rotary shaft 16 and its upper end is used as a free end. The upper end of the fitting arm piece 49 is located lower than the upper end of the rotary shaft 16, and a claw 50 is formed at the upper end portion of the piece 49 and protrudes outwardly (refer to FIG. 3).

Figure 3:
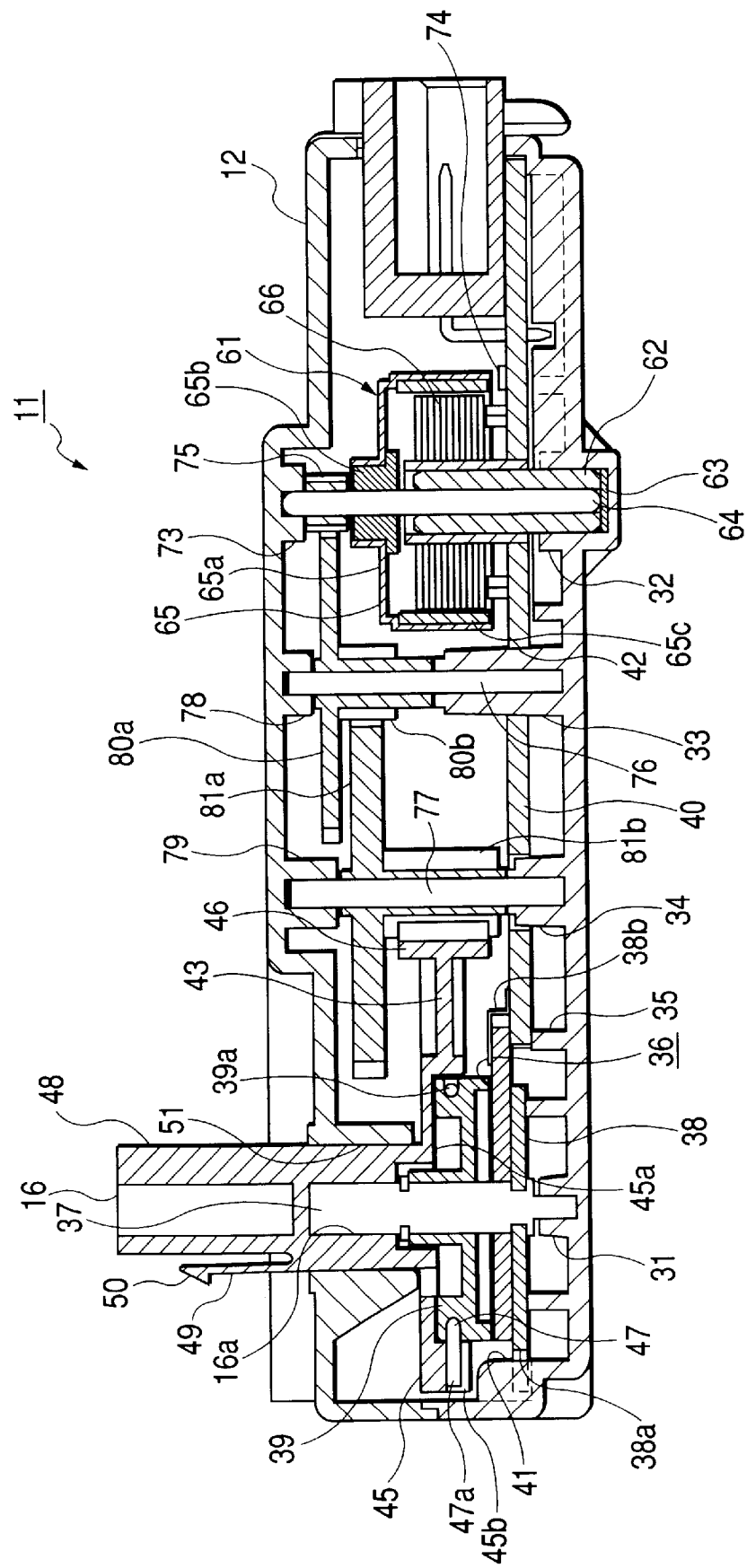
FIG. 3 is a sectional view taken along an axis of each gear of the drive portion.

In the upper half 28, a shaft insertion hole 51 is formed (refer to FIGS. 2 and 3). Nearly half of the rotary shaft 16 protrudes from the shaft insertion hole 51 (refer to FIG. 3).

Figure 4:
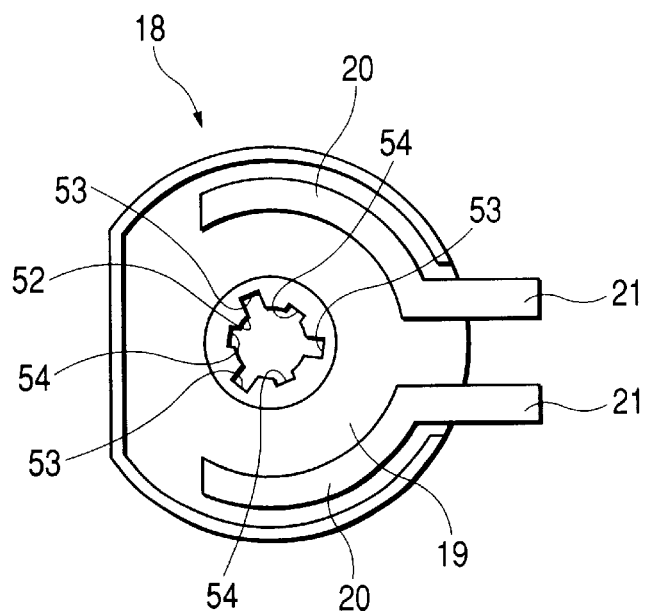
FIG. 4 is an enlarged bottom view of a contact plate according to the invention.

In FIG. 4, a coupling hole 52 is formed in a center portion of the contact plate 18. The coupling hole has insertion notches 53, 53, 53 that are spaced at equal intervals surrounding the coupling hole, and fitting notches 54, 54, 54 are formed among these insertion notches 53, 53, 53 (refer to FIGS. 2 and 4).

The rotary shaft 16 is inserted into the coupling hole 52 of the contact plate 18. At this time, the projecting members 48, 48, 48 of the rotary shaft 16 are inserted into the insertion notches 53, 53, 53 of the contact plate 18, whereby the relative position in the rotational direction of the contact plate 18 in relation to the rotary shaft 16 is defined. The inclined surfaces of the fitting claws 50, 50, 50 of the fitting arm pieces 49, 49, 49 are pressed into the inside edges of the fitting notches 54, 54, 54, whereby the upper end portions of the fitting arm pieces 49, 49, 49 are distorted in the direction of the center of the rotation shaft 16. The fitting notches 54, 54, 54 can slip over the fitting claws 50, 50, 50 in a downward direction, wherein the distorted fitting arm pieces 49, 49, 49 return to the first state, and the fitting claws 50, 50, 50 fit into the fitting notches 54, 54, 54 of the contact plate 18. In this manner, the contact plate 18 is prevented from falling off of the rotary shaft 16, and the maximum height of the contact plate 18 in relation to the rotary shaft 16 is defined.

The portion of the rotary shaft 16 that protrudes upward from the contact plate 18 is next inserted into the insertion hole 10 formed in the lower support arm 5 of the bracket 2 and fitted into the coupling hole 9 of the lamp body 3. At this time, the projecting members 48, 48, 48 of the rotary shaft 16 are fitted into the grooves 9a, 9a, 9a of the coupling hole 9, whereby the relative position of the lamp body 3 in the rotational direction is defined in relation to the rotary shaft 16.

Brush insertion holes 55, 55 are formed in positions corresponding to opposite sides of the shaft insertion hole 51 of the upper half 28 of the case body 12. Further, recesses 56, 56 are formed so as to surround the brush insertion holes 55, 55.

Figure 5:
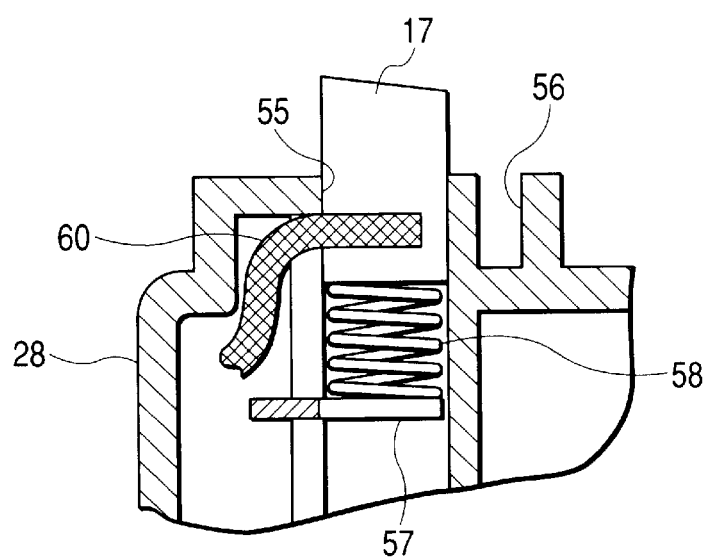
FIG. 5 is an enlarged sectional view of an implementation of a fixed contact.

Brushes functioning as the fixed contact 17, 17, are formed substantially in the shape of a square pillar and are slideably inserted into the brush insertion holes 55, 55. Referring to FIG. 5, below the brush insertion holes 55, 55, and inside the upper half 28, support walls 57, 57 are formed. Coil springs 58, 58 are interposed between the support walls 57, 57 and the brushes 17, 17. Hereby, the brushes 17, 17 are brought into elastic contact with the rotary contacts 20, 20 formed in the contact plate 18, so that the electrical connection is robust between the brushes (fixed contacts) 17, 17 and the rotary contacts 20, 20. Further, the fitting notches 54, 54, 54 of the contact plate 18 securely trap the fitting claws 50, 50, 50 of the fitting arm pieces 49, 49, 49 of the rotary shaft 16 and define the maximum height of the contact plate 18 in relation to the rotary shaft 16. Similarly, the maximum height of the contact plate 18 in relation to the brushes 17, 17 supported by the case body 12 to the rotary shaft 16 is defined. Hereby, good contact between the brushes 17, 17 and the fixed contacts 20, 20 is ensured.

Inside of the upper half 28, conductive plates 59, 59 formed by metal plates having conductivity are supported. One end portions of these conductive plates 59, 59 are connected to the brushes 17, 17 by wires 60, 60. The other end portions 59a, 59a of the conductive plates 59, 59 are used as a connector contact and connected through a connector (not shown) to the power supply. Namely, one-end portions 59a, 59a of the conductive plates 59, 59 are connected through a lighting switch (not shown) to a battery, and their other end portions of the conductive plates are grounded.

In the case body 12, a brushless motor 61 is provided as a drive source. A lower end portion of a bearing sleeve 62 is forced into the shaft standing boss 32 of the lower half 29. At the bottom of a boss hole of the shaft standing boss 32, a thrust bearing 63 is provided (refer to FIGS. 2 and 3).

The bearing sleeve 62 rotatably supports a rotary shaft 64. A rotor 65 is fixed to the rotary shaft 64. The rotor 65 comprises a rotor case 65a of which the upper surface is closed and which is formed in the shape of a cylinder that is short in an axial length, a rotor boss 65b fixed to a center of the upper end portion of the rotor case 65a, and a rotor magnet 65c that is fixed to the inner surface of the rotor case 65a and is magnetized alternately in the circumferential direction. The rotor boss 65b is forced into a portion of the rotary shaft 64, protruding from the upper end of the bearing sleeve 62 thereby to fix the rotor 65 to the rotary shaft 64 (refer to FIGS. 2 and 3).

A stator coil 66 is provided at a periphery of the above bearing sleeve 62 to oppose the rotor magnet 65c, and is fixed onto the print substrate 40. A magnetic center between the stator coil 66 and the rotor magnet 65c is shifted up and down, whereby a downward pressing power (preload) is applied to the rotary shaft 64 by repulsion of the magnetic power. The lower end of the rotary shaft 64 is pressure welded to the thrust bearing 63. Hereby, a vibrating or shakey rotary shaft 64, and further a vibrating rotor 65 are eliminated. Further, the upper end portion of the rotary shaft 64 is received rotatably by a bearing 73 formed on the lower surface of the upper half 28.

The above bearing sleeve 62 is inserted into an insertion hole 42 formed in the print substrate 40. A hole element 74 is provided on the surface of the print substrate 40 in a position opposed to the lower end of the rotor magnet 65c (refer to FIG. 3).

Further, a drive gear 75 is fixed to the upper end portion of the above rotary shaft 64 (refer to FIGS. 2 and 3).

Further, the stator coil 66 is fixed onto the print substrate 40 as follows.

Figure 7:
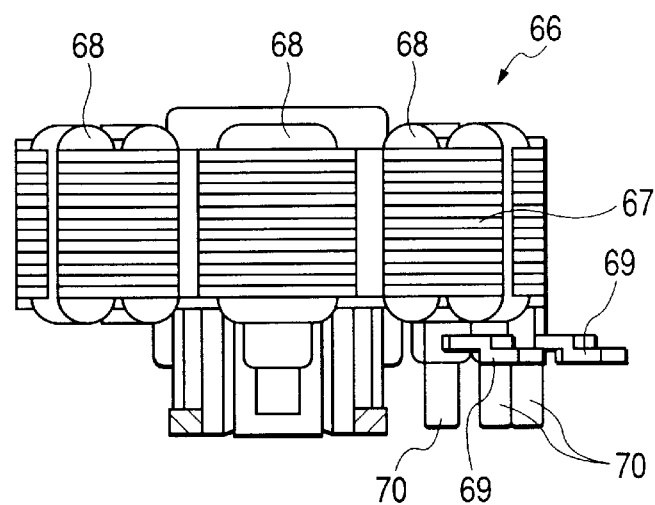
FIG. 7 is a side view showing a stator coil of a motor.
Figure 8:
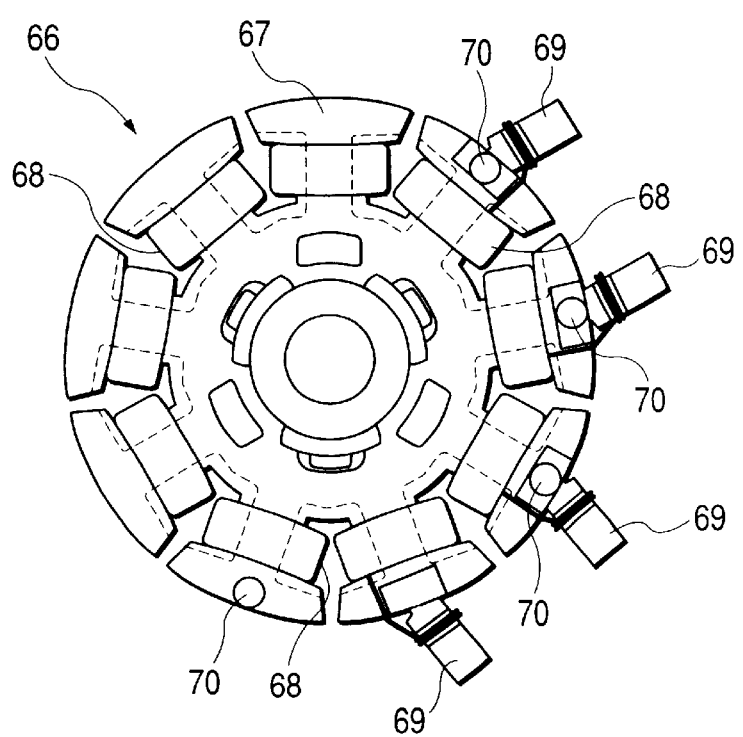
FIG. 8 is a bottom view showing the stator coil of the motor of FIG. 7.
Figure 9:
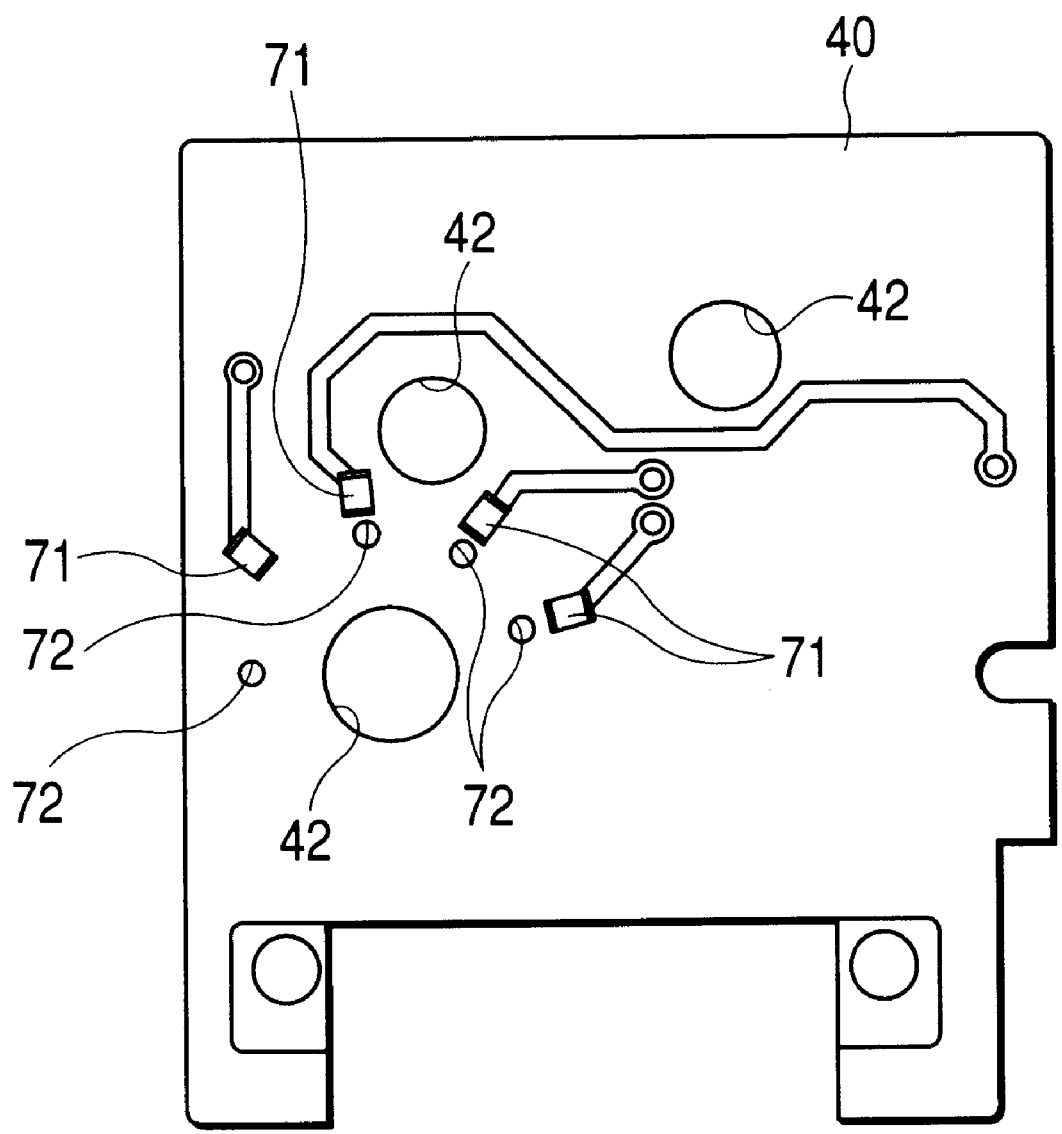
FIG. 9 is a schematic plan view of a print substrate.

In particular, the stator coil 66, as shown in FIGS. 7 and 8, comprises a core 67 and windings 68, 68, 68 wound on the core 67 in three phases. The respective windings 68, 68, 68 are connected to contact legs 69, 69 for supplying electric power to the winding in each phase (contacts for supplying the electric power to each of the windings 68, 68, 68 in three phases, and four neutral points). Further, positioning projections 70, 70, protruding downward are formed at the stator coil 66.

On the upper surface of the print substrate 40, connection lands 71, 71, and positioning holes 72, 72, are formed in a position surrounding the insertion hole 42 into which the bearing sleeve 62 is inserted.

The positioning projections 70, 70, of the stator coil 66 are inserted into the positioning holes 72, 72, of the print substrate 40. Hereby, the stator coil 66 is positioned to the print substrate 40, and the respective contact legs 69, 69, are placed on the connection lands 71, 71, of the print substrate 40. Then, the respective contact legs 69, 69, are soldered to the connection lands 71, 71. The stator coil 66 is thus fixed to the print substrate 40 and connected to a circuit on the print substrate 40.

The lower ends of support shafts 76, 77 are respectively forced into and fixed to the shaft standing bosses 33, 34 formed in the lower half 29. The upper ends of these support shafts 76, 77 are respectively supported by support bosses 78, 79 formed on the lower surface of the upper half 28. Further, these support shafts 76, 77 are inserted individually into the insertion holes 42, 42 formed in the print substrate 40. And, junction gears 80, 81 are supported rotatably around these support shafts 76, 77. In the junction gears 80, 81, a large-diameter gear 80a, 81a and a small-diameter gear 80b, 81b are integrally formed. As shown in FIG. 3, the large-diameter gear 80a of the junction gear 80 is engaged with the above drive gear 75, the small-diameter gear 80b is engaged with the large-diameter gear 81a of the junction gear 81, and the small-diameter gear 81b of the junction gear 81 is engaged with a sector gear 46 of the above output gear 44.

As described above, the rotary shaft 64 becomes a rotational center of the motor 61 and is rotatably supported by the bearing sleeve 62 fixed to the shaft standing boss 32 formed in the case body 12 (lower half 29). The respective shafts 76, 77, 37 for defining the rotational centers of the drive gear 75 are fixed to the shaft standing bosses 33, 34, 31 formed in the case body 12 (lower half 29), and the gears 80, 81, 46 that are geared with the drive gear 75. The gears 75, 80, 81 and 46 can be assembled with a distance among shafts according to a design, so that the rotation of the motor 61 is smoothly transmitted up to the last gear 46, there is no loss in the rotation of the motor 61, the electric power consumption can be reduced, there is little generation of gear sound, and a quiet drive portion can be realized.

Electrical power is supplied to the stator coil 66 of the above brushless motor 61 through the print substrate 40. When it can receive electrical power from the power source (not shown), the rotor 65 rotates, the drive gear 75 coaxial with the rotor 65 rotates, and its rotation is transmitted through the junction gears 80, 81 to the sector gear 46 of the output gear 44 to thereby rotate the sector gear 46. Accordingly, the rotary shaft 16 formed integrally with the output gear 44 rotates, whereby the lamp body 3 rotates and the direction of its light irradiation is changed in the horizontal direction.

Even when the lamp body 3 thus rotates, the power supply connection to the light source bulb 23 is ensured by the slideable contact between the fixed contacts 17, 17 having the slip ring structure and the rotary contacts 20, 20. And, since the power supply cord 27 rotates together with the lamp body 3 as a whole, it is not twisted and does not receive any stress due to the rotation of the lamp body 3. Though there is concern that fine particles may be produced from either the fixed contacts 17, 17 or the rotary contacts 20, 20 or from both by the slide contact between the fixed contacts 17, 17 and the rotary contacts 20, 20, such particles would enter into the recesses 56, 56 formed so as to surround the fixed contacts 17, 17, so that they do not scatter in the surroundings.

As described above, when the lamp body 3 is rotated, simultaneously the rotary disc 39 of the potentiometer 36 is rotated through the coupling spring 47. The resistance value output from the potentiometer 36 then changes, so that the direction of the lamp body 3 can be known. In order to exactly know the direction of the lamp body 3 by the resistance value output from the potentiometer 36, it is necessary to match the direction of the lamp body 3 with the position of the rotary disc 39 of the potentiometer 36. Namely, when the lamp body is located in a middle position, for example, when the lamp is facing directly to the front, it is necessary to adjust the rotational position of the rotary disc 39 in relation to the base plate 38 so that the potentiometer 36 outputs the resistant value representing the middle state. If the lamp is assembled according to a design, the direction of the lamp body 3 and the direction of the rotary disc 39 of the potentiometer 36 coincide. However, in fact, the direction of the lamp body 3 and the direction of the rotary disc 39 of the potentiometer 36 do not always coincide due to tolerance considerations and unevenness of each potentiometer 36. Therefore, when the lamp body is located in the middle position, the potentiometer 36 must be adjusted so as to output the resistant value (0 (zero) position signal) representing that the lamp body 3 is located in the middle position, that is, 0 (zero) positioning adjustment is required.

Figure 6:
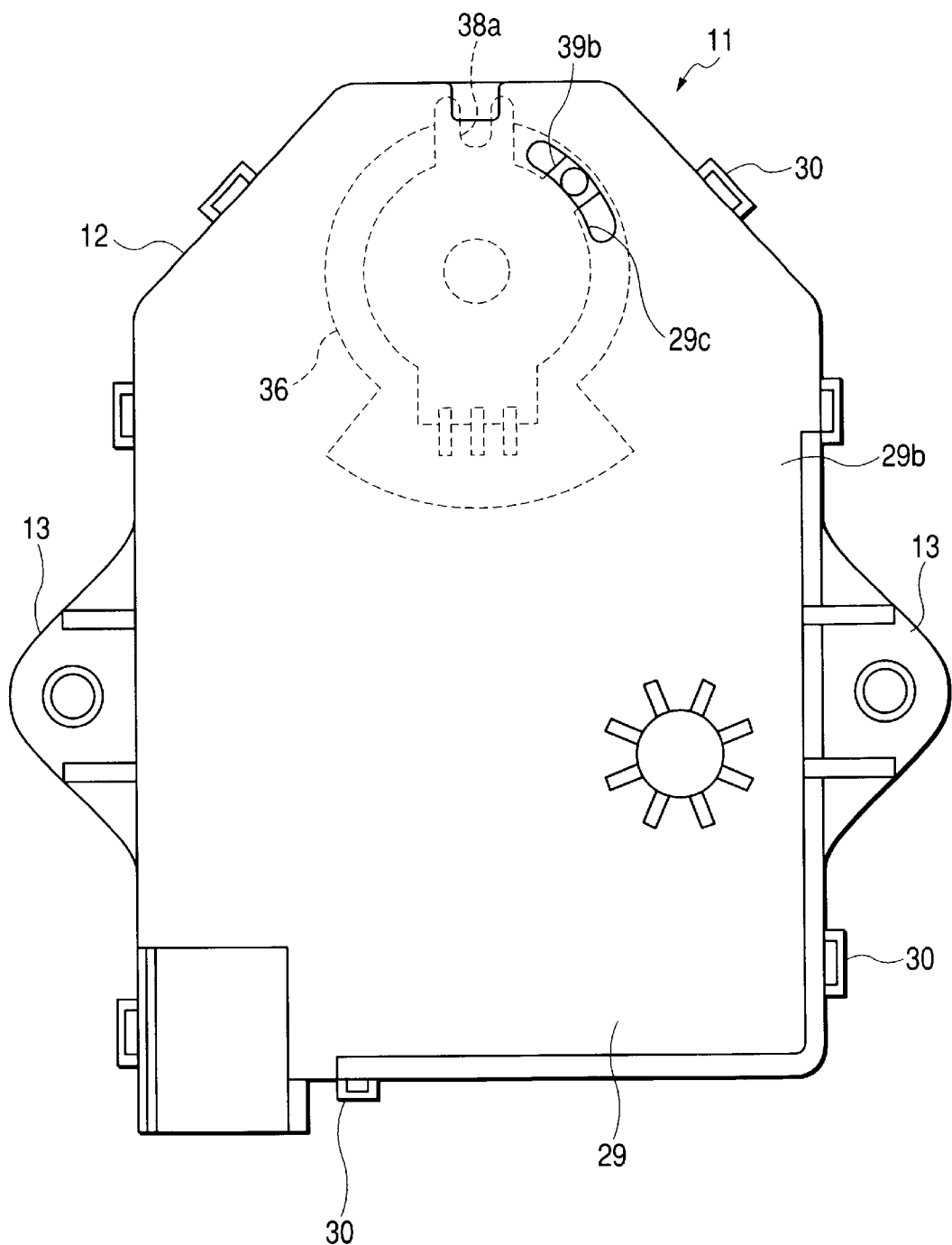
FIG. 6 is a bottom view of a drive portion according to the invention.

Therefore, firstly, the motor 61 drives the lamp body 3 to rotate up to the position where the potentiometer 36 outputs the 0 position signal. Then, from a circular-arc shaped hole 29c (refer to FIG. 6) formed in a bottom surface wall 29b of the lower half 29 of the case body 12, a jig such as a pin is inserted into the body case 12, fitted into an hole of an adjustment projection 39b protruding from the side surface of the rotary disc 39, and fixed so as not to move in its state.

Further, the hole 29c is formed in the shape of the circular arc having the shaft axis of the shaft standing boss 31 formed in the lower half 29 as a center. As described above, after the adjustment projection 39b was fixed by the jig, the motor 61 is driven again thereby to rotate the lamp body 3 and cause the lamp body 3 to be located in the middle position. At this time, the rotary disc 39 of the potentiometer 36 cannot rotate since the position of the adjustment projection 39b is fixed by the jig, and a slip is produced between the rotary disc 39 and the coupling spring 47 (clutch means), whereby only the lamp body 3 rotates. Thus, the direction of the lamp body 3 and the direction of the rotary disc 39 of the potentiometer 36 are exactly matched.

In the above embodiment, though the brushless motor is indicated as a drive source, the drive source may be motors of other types, or it may be drive sources other than a motor, for example, a solenoid.

The shape and structure of each part indicated in the above embodiments are simply and solely one of embodied examples for carrying out the invention, and it is to be understood that a technical range of the invention should not be limited by them.

As clear from the foregoing, a vehicle lamp of the invention includes a drive portion having a drive source, and a lamp body that has a light source and is supported by a rotary shaft rotated by the drive portion. The lamp includes a rotary contact that is provided around the above rotary shaft and rotates together with the lamp body, and a fixed contact that is provided for the above drive portion and comes into slideable contact with the rotary contact. The rotary contact and the light source are electrically connected through a power supply cord and electric power is supplied to the fixed contact.

Accordingly, in the vehicle lamp of the invention, since a pulling-out position of the power supply cord is near the rotary shaft, the moving range of the power supply cord with the rotation is narrow. Further, since the connection between the power supply cord and the power supply portion is performed through rotary contact and fixed contact that comes into slideable contact with each other, the power supply cord is not twisted.

According to another aspect of the invention, since the drive source and fixed contact are supported by a case body, and a recess portion is formed at a position on an upper surface of the case body where is close to the fixed contact and almost corresponds to a moving range of the above fixed contact, particles produced by the slideable contact between the fixed contact and the rotary contact enter into the recess, whereby they do not scatter in the surroundings.

According to another aspect of the invention, the above rotary contact is formed in a contact plate that is a separate body from the lamp body, there is provided a height defining means for defining a maximum distance between the contact plate and the fixed contact. There is also provided a spring means for bringing the fixed contact into elastic contact with the rotary contact. Therefore, bad contact between the fixed contact and the rotary contact is not produced, and the fixed contact is brought into contact with the rotary contact at a fixed contact pressure.

What is claimed is:
1. A vehicle lamp comprising:
    a drive portion having a rotary shaft and a drive source; and
    a lamp body with a light source, the lamp body supported by the rotary shaft and operable to be rotated by the drive portion;

a rotary contact provided around the rotary shaft and rotating together with the lamp body; and a fixed contact, wherein the rotary contact and the light source are electrically connected through a power supply cord and electric power is supplied to the fixed contact, and wherein the rotary contact is slideably contacting the fixed contact.

2. The vehicle lamp according to claim 1, wherein said drive portion supported by a case body and said fixed contact protrudes from an upper surface of said case body.

3. The vehicle lamp according to claim 2, wherein the drive source and fixed contact are supported by a case body, and a recess portion is formed at a position on an upper surface of the case body, wherein the recess portion is close to the fixed contact and almost corresponds to a moving range of the above fixed contact.

4. The vehicle lamp according to claim 2, wherein the rotary contact is formed in a contact plate that is a separate body from the lamp body, and the rotary shaft further comprises:

height defining means for defining a maximum distance between the contact plate and the fixed contact; and spring means for brining the fixed contact into elastic contact with the rotary contact.

5. The vehicle lamp according to claim 3, wherein the rotary contact is formed in a contact plate that is a separate body from the lamp body, and the rotary shaft further comprises:

height defining means for defining a maximum distance between the contact plate and fixed contact; and spring means for bringing the fixed contact into elastic contact with the rotary contact.

6. The vehicle lamp according to claim 1, wherein the drive source and fixed contact are supported by a case body, and a recess portion is formed at a position on an upper surface of the case body, wherein the recess portion is close to the fixed contact and almost corresponds to a moving range of the above fixed contact.

7. The vehicle lamp according to claim 1, wherein the rotary contact is formed in a contact plate that is a separate body from the lamp body, and the rotary shaft further comprises:

height defining means for defining a maximum distance between the contact plate and the fixed contact; and spring means for bringing the fixed contact into elastic contact with the rotary contact.

8. The vehicle lamp according to claim 6, wherein the rotary contact is formed in a contact plate that is a separate body from the lamp body, and the rotary shaft further comprises:

height defining means for defining a maximum distance between the contact plate and the fixed contact; and spring means for bringing the fixed contact into elastic contact with the rotary contact.

9. A vehicle lamp comprising:

a lamp body including a coupling hole and a light source;

a drive portion including a rotary shaft coupled to the coupling hole, a drive source and fixed contacts;

a contact plate having a plate coupling hole coupled to the rotary shaft, and including arc-shaped rotary contacts for slideable engagement with the fixed contacts; and a power supply cord electrically connecting the light source to the rotary contacts.

10. The apparatus of claim 9 further comprising a case body that houses the drive portion.

11. The apparatus of claim 10 further comprising a recess portion formed on an upper surface of the case body near the fixed contacts.

12. The apparatus of claim 9 wherein the rotary shaft further comprises:

height defining means that defines a distance between the contact plate and the fixed contacts; and biasing means for urging the fixed contact into elastic contact with the rotary contact.

* * * * *